(12) United States Patent
Tseng

(10) Patent No.: US 8,091,444 B2
(45) Date of Patent: Jan. 10, 2012

(54) TRANSMISSION MECHANISM HAVING DECELERATION FUNCTION

(75) Inventor: Kuan-Shu Tseng, Xindian (TW)

(73) Assignee: T-Motion Technology Co. Ltd., Taipei (TW)

(*) Notice: Subject to any disclaimer, the term of this patent is extended or adjusted under 35 U.S.C. 154(b) by 86 days.

(21) Appl. No.: 12/573,981

(22) Filed: Oct. 6, 2009

(65) Prior Publication Data

US 2011/0079486 A1 Apr. 7, 2011

(51) Int. Cl.
- *F16H 3/06* (2006.01)
- *F16H 29/20* (2006.01)
- *F16D 67/00* (2006.01)
- *B60T 8/72* (2006.01)

(52) U.S. Cl. .......... 74/89.39; 74/89.14; 192/223.2; 192/223.4; 188/180

(58) Field of Classification Search .......... 74/89.14, 74/89.16, 89.23, 89.36, 89.37, 89.39; 192/223.2, 192/223.4; 5/616; 297/362.12, 362.14; 188/82.1, 188/82.8, 156, 158, 180, 186

See application file for complete search history.

(56) References Cited

U.S. PATENT DOCUMENTS

| | | | | |
|---|---|---|---|---|
| 7,137,489 B2 * | 11/2006 | Bastholm et al. | ............ | 188/156 |
| 7,533,591 B2 * | 5/2009 | Wang | ............ | 74/89.39 |
| 7,594,450 B2 * | 9/2009 | Wu et al. | ............ | 74/89.38 |
| 7,902,704 B2 * | 3/2011 | Tseng | ............ | 310/83 |
| 2001/0037924 A1 * | 11/2001 | Montanana | ............ | 192/12 R |
| 2006/0054451 A1 * | 3/2006 | Klinke | ............ | 192/223.4 |
| 2006/0278494 A1 * | 12/2006 | Itomi | ............ | 192/223.2 |
| 2007/0227279 A1 * | 10/2007 | Watanabe et al. | ............ | 74/89.14 |
| 2010/0225188 A1 * | 9/2010 | Tseng | ............ | 310/83 |

FOREIGN PATENT DOCUMENTS

| EP | 662573 A1 * | 7/1995 |
|---|---|---|
| EP | 1 556 630 B1 | 7/2005 |

* cited by examiner

*Primary Examiner* — Justin Krause
*Assistant Examiner* — Adam D Rogers
(74) *Attorney, Agent, or Firm* — Chun-Ming Shih; HDLS IPR Services

(57) ABSTRACT

A transmission mechanism having a deceleration function includes a guide screw, a worm wheel set, an intermediary ring, an isolator and a passive sleeve. The worm wheel set is fitted onto the guide screw and includes worm wheel and plural claw arms. A spacing slot is formed between any two adjacent claw arms. The intermediary ring is fitted onto a peripheral edge of each claw arm. The isolator surrounds a peripheral edge of the intermediary ring with one side fixed to an actuator. With plural grooves arranged on a peripheral edge thereof, the passive sleeve is fitted onto the guide screw. An accommodation space is formed among the groove, spacing slot and intermediary ring. Each needle roller is accommodated in the accommodation space and inter-contacted with the claw arm, the intermediary ring and the passive sleeve.

7 Claims, 9 Drawing Sheets

TRANSMISSION MECHANISM HAVING DECELERATION FUNCTION

BACKGROUND OF THE INVENTION

1. Field of the Invention

The present invention in general relates to a transmission mechanism, in particular, to a transmission mechanism for a linear actuator.

2. Description of Prior Art

Linear actuators mainly use a plurality of driving assemblies, for example, motor, worm and worm wheel, to rotate a guide screw. In the meantime, a telescopic tube is engaged with the guide screw and is driven thereby to perform the linear motions of stretch and retraction. Since there are many superior conditions of the linear actuator, for example, simplicity and convenience, compared to those of air/oil pressure cylinders in structure and arrangement, the linear actuator has been comprehensively applied to the facilities of hospital bed and electric chair or other occasions needed the operations of stretch and retraction.

According to prior arts, in order to increase mechanism efficiency or possess faster moving speed, it usually has to enlarge the guide route of the guide screw. However, there are two problems arisen subsequently. First of all, the guide screw is unable to be self-locked. Secondly, the declining speed of the nut engaged with the guide screw and the telescopic tube connected to the nut is too fast, causing an uncomfortable problem to the user.

According to a prior art disclosed in European patent publication-EP 1556630B1, the actuator includes a reversible motor, a worm and worm wheel set, an adjustable assembly, a cylindrical portion and a coil spring. The worm and worm wheel set is respectively connected to the motor and the adjustable assembly for operation. The coil spring is arranged to the cylindrical portion externally and has a specific winding direction, such that the coil spring has a braking effect imposing on the adjustable assembly with respect to a specific motion direction, whereby the coil spring is to tighten on the surroundings of the cylindrical portion. By so doing, the coil spring is positioned on the static worm and worm wheel set with one side fixed at the worm wheel, making the coil spring rotate around the static cylindrical portion fixed.

However, according to this kind of actuator, during braking process, a relative motion is arisen between the coil spring and the cylindrical portion to generate frictional heat, which has high temperature and is easy to cause melting on the cylindrical portion. Furthermore, when the guide route of the guide screw becomes larger, the braking power needed by the coil spring is greater. In this case, a high temperature melting is easier to occur. In addition, when there is no loading, the braking force is still existed. This means that the motor still has to overcome the resistance of the coil spring when a retraction is performed. So, it is still needed to consume power even when there is no loading, causing an unnecessary waste of power, which is a drawback needed to be solved.

Accordingly, after a substantially devoted study, in cooperation with the application of relative academic principles, the inventor has finally proposed the present invention designed reasonably to possess the capability to improve the drawbacks of the prior art significantly.

SUMMARY OF THE INVENTION

Therefore, in order to solve aforementioned problems, the invention is mainly to provide a transmission mechanism having a deceleration function. By means of the friction force generated between each needle roller and intermediary ring, the rotation of the guide screw in a specific direction is hindered to reach a deceleration function.

Secondly, the invention is to provide a transmission mechanism having a deceleration function, used in a linear actuator having a worm, including a guide screw, a worm wheel set, an intermediary ring, an isolator and a passive sleeve. The worm wheel set is fitted onto one side of the guide screw and includes a worm wheel driven by the worm to rotate and a plurality of claw arms extended outwardly from one side of the worm wheel. A spacing slot is formed between any two adjacent claw arms. The intermediary ring is fitted onto a peripheral edge of each claw arm. The isolator surrounds a peripheral edge of the intermediary ring with one side fixed to an actuator for limiting the intermediary ring to rotate in a single direction. With a plurality of grooves arranged on a peripheral edge thereof, the passive sleeve is fitted onto the guide screw by being linked to each other. An accommodation space is formed among the groove, the spacing slot and the intermediary ring. Each needle roller is separately accommodated in the accommodation space and is inter-contacted with the claw arm, the intermediary ring and the passive sleeve. When the worm wheel is driven to rotate, the claw arms push the needle rollers and the intermediary ring to rotate. Since the intermediary ring is wedged and stopped by the isolator, the frictional force to hinder the rotation driven by the claw arms to the needle rollers and the intermediary arms is increased, lowering down the rotational speed of the passive sleeve and the guide screw.

Thirdly, the invention is to provide a transmission mechanism having a deceleration function, used in a linear actuator having an active wheel, including a guide screw, a passive assembly, an intermediary ring, an isolator and a plurality of needle rollers. The passive assembly includes a passive wheel driven by the active wheel to rotate, a short axle passing through the passive wheel, a coupling fitted onto the short axle and a claw ring connected to the coupling and having a plurality of claw arms. A spacing slot is formed between any two adjacent claw arms. The intermediary ring is fitted onto a peripheral edge of each claw arm. The isolator surrounds a peripheral edge of the intermediary ring with one side fixed to an actuator for limiting the intermediary ring to rotate in a single direction. With a plurality of grooves arranged on a peripheral edge thereof, the passive sleeve is fitted onto the guide screw by being linked to each other. An accommodation space is formed among the groove, the spacing slot and the intermediary ring. Each needle roller is separately accommodated in the accommodation space and is inter-contacted with the claw arm, the intermediary ring and the passive sleeve. When the worm wheel is driven to rotate, the claw arms push the needle rollers and the intermediary ring to rotate.

Since the intermediary ring is wedged and stopped by the isolator, the frictional force to hinder the rotation driven by the claw arms to the needle rollers and the intermediary arms is increased, lowering down the rotational speed of the passive sleeve and the guide screw.

Since of following functions and merits, the invention has small frictional heat without the tendency to generate heat, such that the melting phenomenon is avoided. It is easy for the intermediary ring to rotate in the isolator, making the transmission mechanism have an excellent transmission performance. When the guide screw is pushed backward, there is no relative transmission generated among the intermediary ring, each needle roller, the passive sleeve and the guide screw, whereby the guide screw is fixed firmly and it can effectively prevent both the guide screw and the nut from incurring a self-sliding phenomenon. Following the increase of the load, the frictional force between each transmission components is increased, so that there is no unnecessary frictional force generated and there is no power wasted when there is no load.

The retracting speed of the telescopic tube is substantially equal, even under different loads. So, the declining speed can be kept constant, increasing the using comfort of user significantly.

BRIEF DESCRIPTION OF DRAWING

The features of the invention believed to be novel are set forth with particularity in the appended claims. The invention itself, however, may be best understood by reference to the following detailed description, which describes a number of embodiments of the invention, taken in conjunction with the accompanying drawings, in which:

DETAILED DESCRIPTION OF THE INVENTION

In cooperation with attached drawings, the technical contents and detailed description of the present invention are described thereinafter according to a number of embodiments, not used to limit its executing scope. Any equivalent variation and modification made according to appended claims is all covered by the claims claimed by the present invention.

Figure 1:
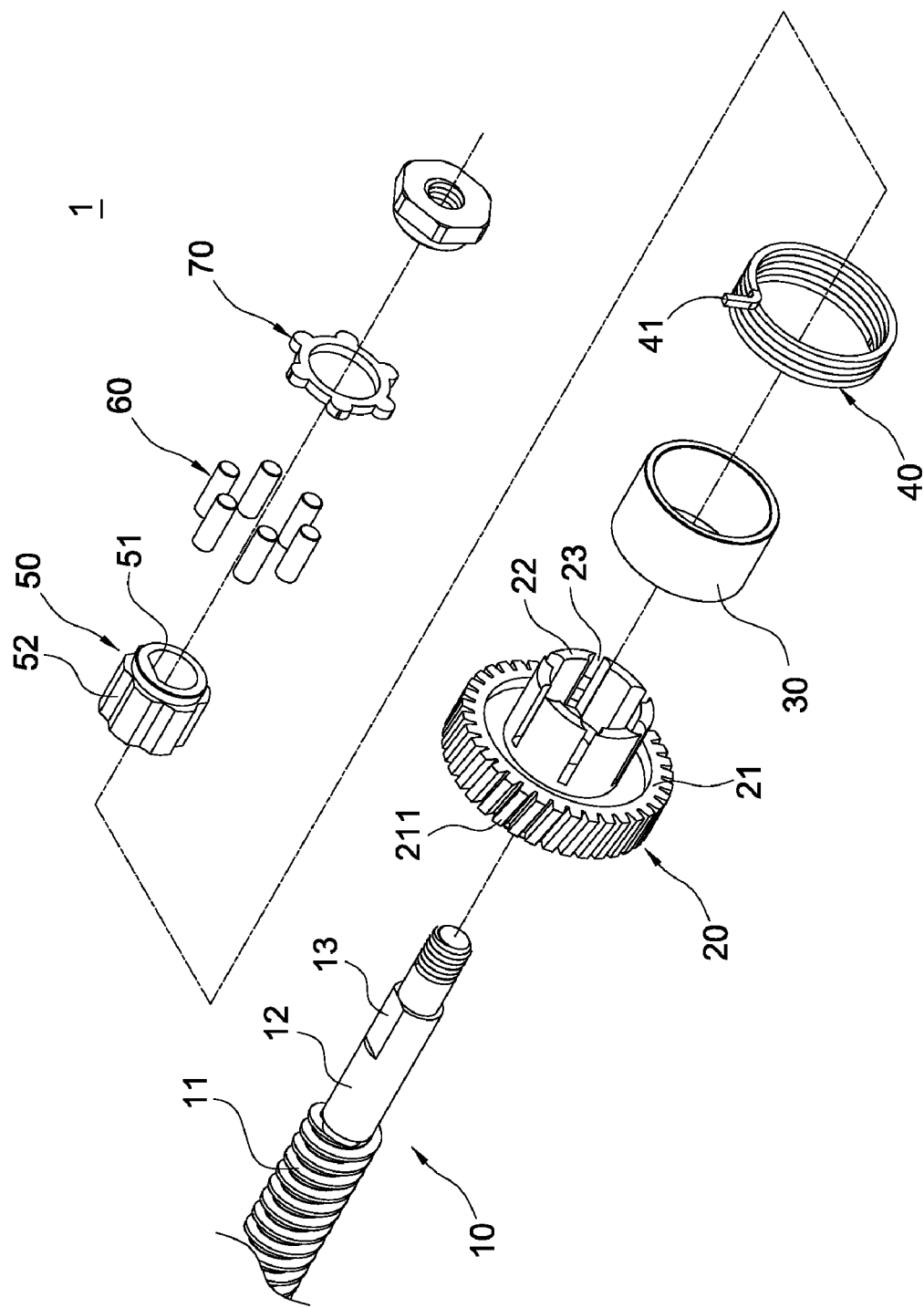
FIG. 1 is a perspective explosive illustration of a transmission mechanism according to the present invention.

As shown in FIG. 1, the invention is to provide a transmission mechanism having deceleration function. This transmission mechanism 1 mainly includes a guide screw 10, a worm wheel set 20, an intermediary ring 30, an isolator 40, a passive sleeve 50 and a plurality of needle rollers 60.

The guide screw 10 has a threaded section 11 and an axial section 12 extended from the threaded section 11. In the meantime, an external positioning plane 13 is arranged at one side of the axial section 12. According to a practical requirement of transmission, this guide screw can be arranged as a left-hand rotation or a right-hand rotation. In this embodiment, the guide screw 10 is arranged as a right-hand rotation.

The worm wheel set 20 can be made of a plastic material (e.g., POM) and fitted onto the axial section 12 of the guide screw 10. The worm wheel set 20 includes a worm wheel 21 and a plurality of claw arms extended outwardly from one side of the worm wheel 21. A spacing slot 23 is formed between any two adjacent claw arms 22. A plurality of worm teeth 211 is formed on a circumference of the worm wheel 21. According to the practical requirement of transmission, these worm teeth 211 can be separately configured as a left-hand rotation or a right-hand rotation. In this embodiment, these worm teeth 211 are separately configured as a right-hand rotation same as the guide screw 10.

The intermediary ring 30 is a cylindrical body made of a metallic material and is fitted onto a peripheral edge of each claw arm 22, such that the intermediary ring 30 is inter-contacted with a peripheral surface of each claw arm 22.

In this embodiment, the isolator 40 is a coil spring, however, not limited to this configuration only. The isolator 40 is to restrict the intermediary ring 30 to rotate only in one direction. This isolator 40 is elastically wedged at the peripheral edge of the intermediary ring 30. The rotational direction of the isolator 40 is same as that of the worm tooth 211. In the meantime, a positioning section 41 is extended outwardly from the right side of the isolator 40.

An inner plane 51 arranged in the passive sleeve 50 is inter-contacted with the positioning plane 13 of the guide screw 10 and can be rotated together after being inter-fitted with the guide screw 10. A plurality of grooves 52 separately shown as a "V" shape are arranged at a peripheral edge of the passive sleeve 50. After the passive sleeve 50, each claw arm 22 and the intermediary ring 30 have been assembled, an accommodation space 55 is formed among the groove 52, the spacing slot 23 and the inner wall face of the intermediary ring 30.

The needle roller 60, a solid cylindrical body, accommodated in the accommodation space 55, makes a rolling contact with the claw arm 22, the intermediary ring 30 and the passive sleeve 50.

In addition, the transmission mechanism 1 of the invention further includes a limit block cover 70, which is fitted onto one side of the passive sleeve 50 and is extended outwardly to cover the needle rollers 60, such that the moving positions of the needle rollers 60 are restricted.

Figure 2:
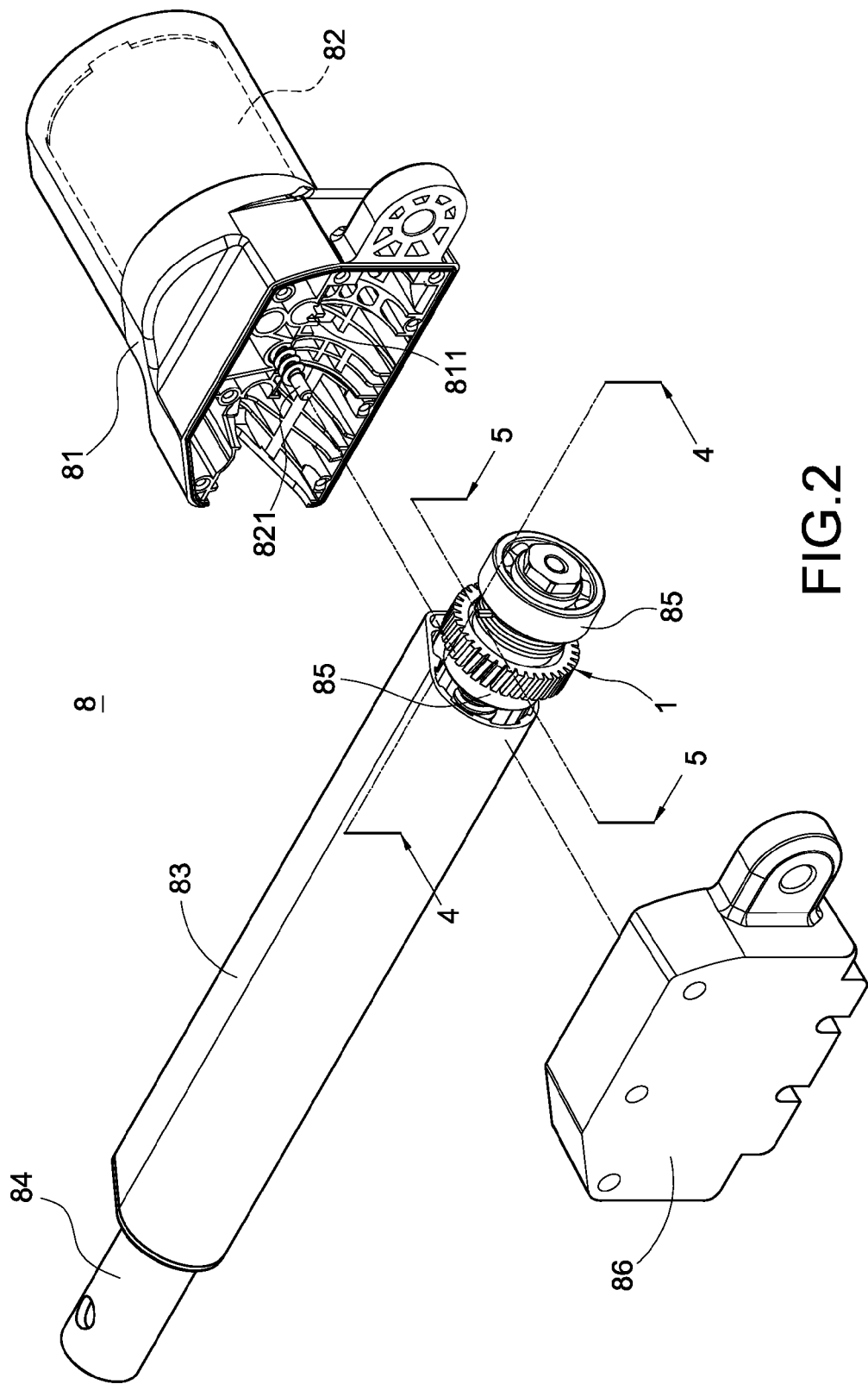
FIG. 2 is a perspective explosive illustration of a transmission mechanism according to the present invention applied in an actuator.
Figure 3:
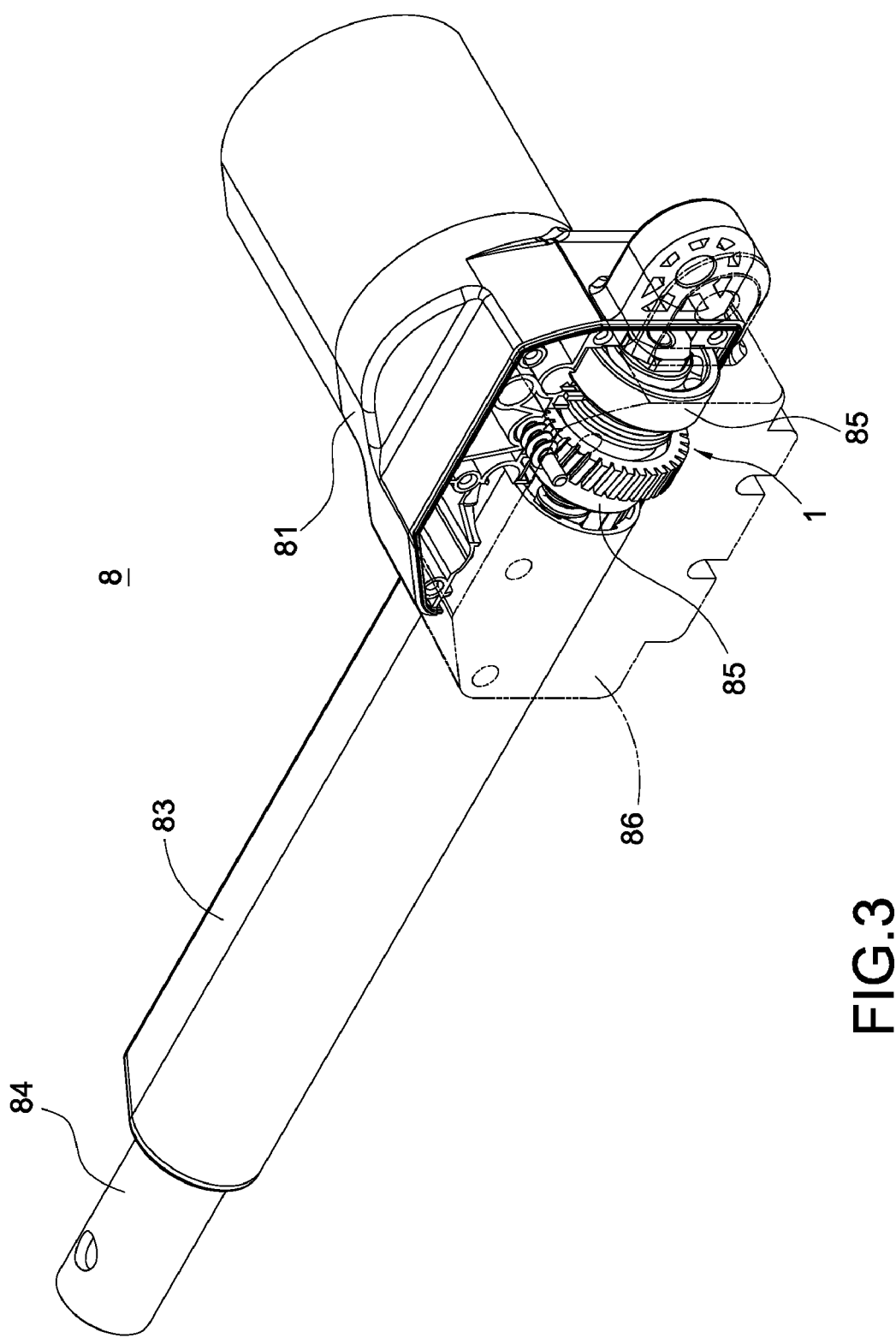
FIG. 3 is an assembled illustration of a transmission mechanism according to the present invention applied in an actuator.
Figure 4:
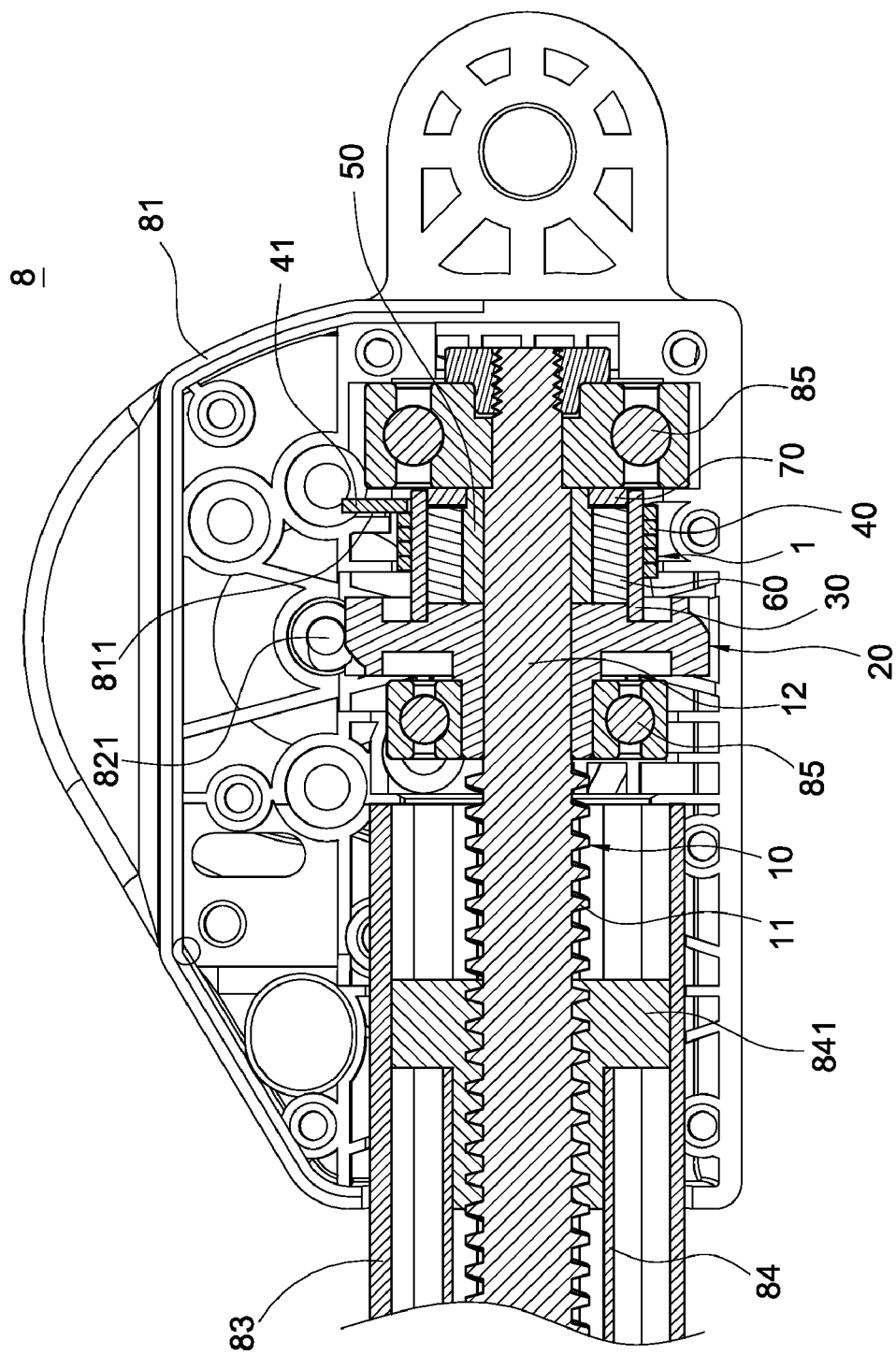
FIG. 4 is a sectional view of FIG. 3 along a sectional line "4-4"

As shown in FIG. 2 through FIG. 4, the transmission mechanism 1 of the invention can be applied to a linear actuator 8 mainly including a lower seat body 81, a motor 82, an external tube 83, a telescopic tube 84, a plurality of bearings 85 and an upper seat body 86. In this case, the motor 82 is accommodated in the lower seat body 81, a center of which is extended with a worm 82 engaged with the worm wheel 21 to transmit. In addition, an embedded slot 811 arranged in the lower seat body 81 is for fixing the positioning section 41 of the isolator 40 by being embedded therein. One side of the external tube 83 is fixed in the lower seat body 81, while the telescopic tube 84 is arranged in the external tube 83. In the meantime, one side of the telescopic tube 84 is arranged a nut 841 engaged with the guide screw 10, as shown in FIG. 4, such that the telescopic tube 84 can make a linear movement of stretch or retraction with respect to the external tube 83 by means of the rotation of the guide screw 10. On the other hand, these bearings are separately fitted onto the guide screw 10 and the worm wheel 21 and are supported in the lower seat body 81. In this case, the lower seat body 81 is housed by being covered under the upper seat body 86 correspondingly, whereby a linear actuator 8 is assembled.

Figure 5:
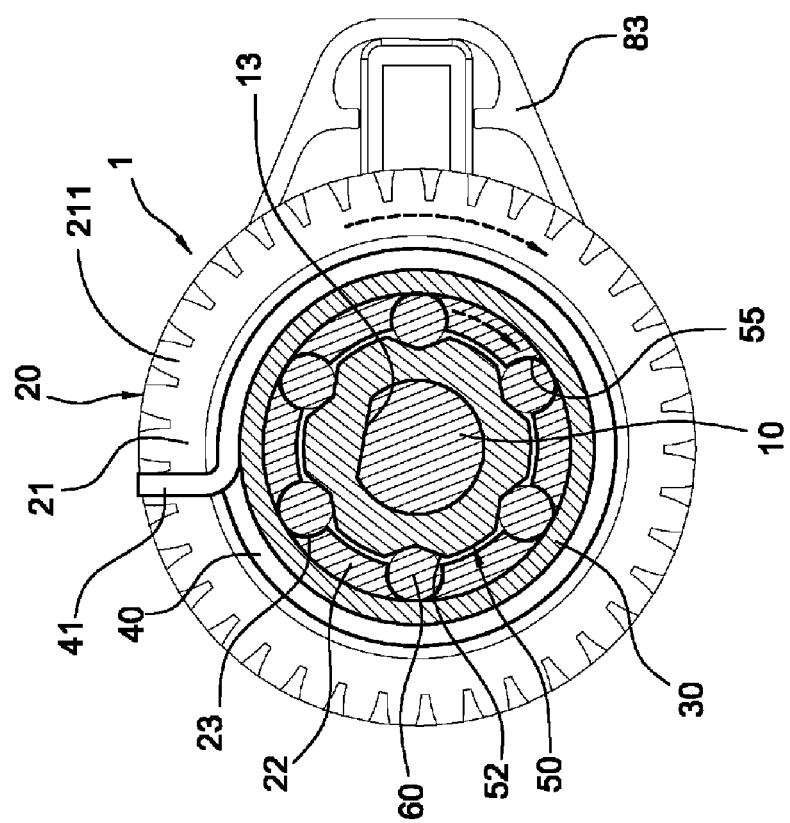
FIG. 5 is a sectional view of FIG. 2 along a sectional line "5-5" during a using status of the present invention.

As shown in FIG. 5, when the worm wheel 21 is positively driven by the worm shaft 821 to rotate in a clockwise direction, namely, the telescopic tube 84 being driven by the guide screw 10 to be retracted into the external tube 83, each claw arm 22 will push the intermediary ring 30 and each needle roller 60 to rotate. By means of the coil spring, the rotational direction of the isolator 40 is same as that of the worm wheel 21, in which the positioning section 41 of the isolator 40 is inset into the embedded slot 811 of the lower seat body 81, such that the intermediary ring 30 is tightened by being wedged and stopped by the isolator 40, namely, the intermediary ring 30 being hugged by the isolator 40 and unable to rotate. In this case, the frictional forces imposed onto each needle roller 60 and the intermediary ring 30 by each claw arm 22 are increased, so the rotational speeds of the passive sleeve 50 and the guide screw 10 are lowered down. Therefore, when the linear actuator 8 is arranged in the electric bed or chair, the speed of the telescopic tube 84 is slowed down when it is retracted into the external tube 83, thereby, the using comfort of the user being enhanced.

Figure 6:
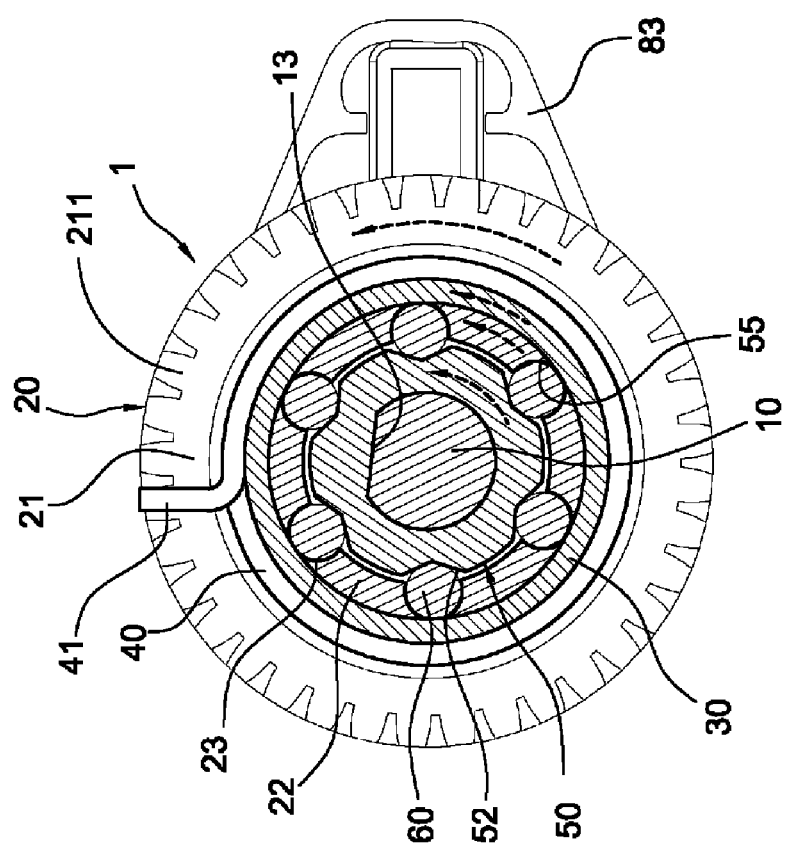
FIG. 6 is a sectional view of FIG. 2 along a sectional line "6-6" during a using status of the present invention.

As shown in FIG. 6, when the worm wheel 21 is negatively driven by the worm shaft 821 to rotate in a counterclockwise direction, namely, the telescopic tube 84 being driven by the guide screw 10 to be stretched out of the external tube 83, each claw arm 22 will push the intermediary ring 30 and each needle roller 60 to rotate. By means of the coil spring, the rotational direction of the isolator 40 is opposite to that of the worm wheel 21, so the isolator 40 will generate a loose status due to the rotation of the intermediary ring 30. By so doing, the frictional forces among the intermediary ring 30, the isolator 40 and each needle roller 60 are decreased, such that the intermediary ring 30 can be rotated easily in the isolator 40. Thereby, the transmission mechanism 1 can have an excellent transmission performance.

Figure 7:
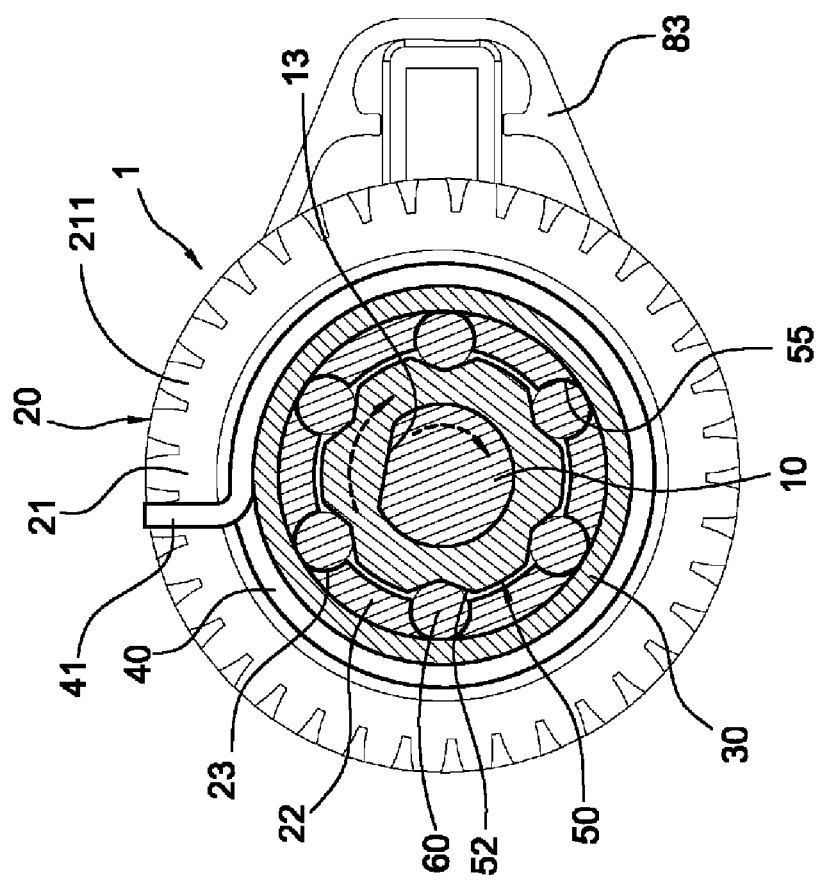
FIG. 7 is a sectional view of FIG. 2 along a sectional line "7-7" during a using status of the present invention.

As shown in FIG. 7, when the guide screw 10 is pushed back by the nut 841 of the telescopic tube 10, the passive sleeve 50 is driven to actuation. Two inclining faces of the "V"-shaped groove 52 of the passive sleeve 50 push each needle roller 60 due to the frictional operation. Since the intermediary ring 30 is tightened and wedged by the isolator 40 shown as a coil spring configuration, namely, the intermediary ring 30 being hugged and unable to generate rotation, there is no transmission generated relatively among the intermediary ring 30, each needle roller 60, the passive sleeve 50 and the guide screw 10. Under this condition, the guide screw 10 is held fixedly, effectively preventing the guide screw 10 and the nut 841 from generating self-sliding phenomenon. Therefore, without installing any self-locking apparatus, the invention has a self-locking effect.

Figure 8:
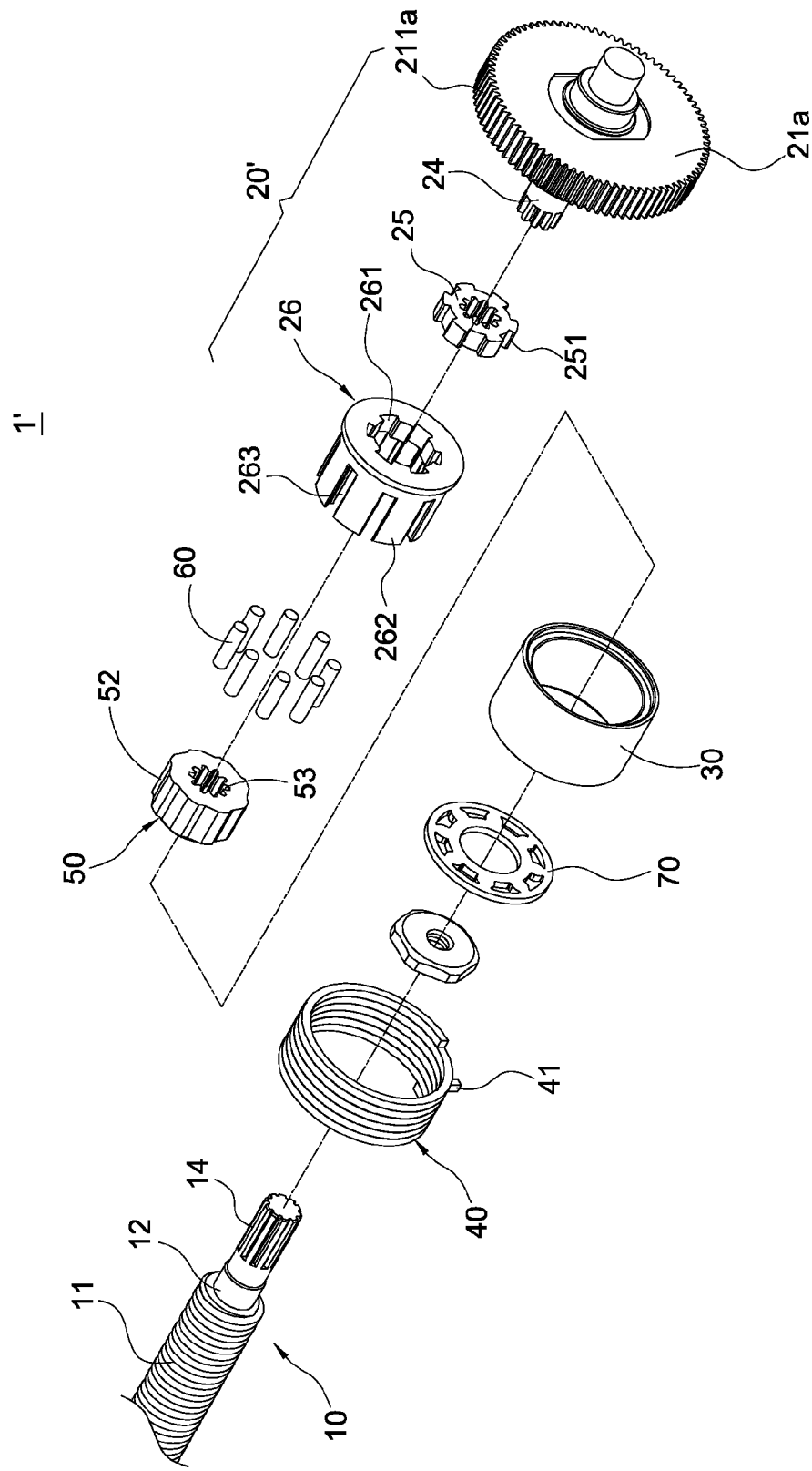
FIG. 8 is a perspective explosive illustration of a transmission mechanism according to another embodiment of the present invention.
Figure 9:
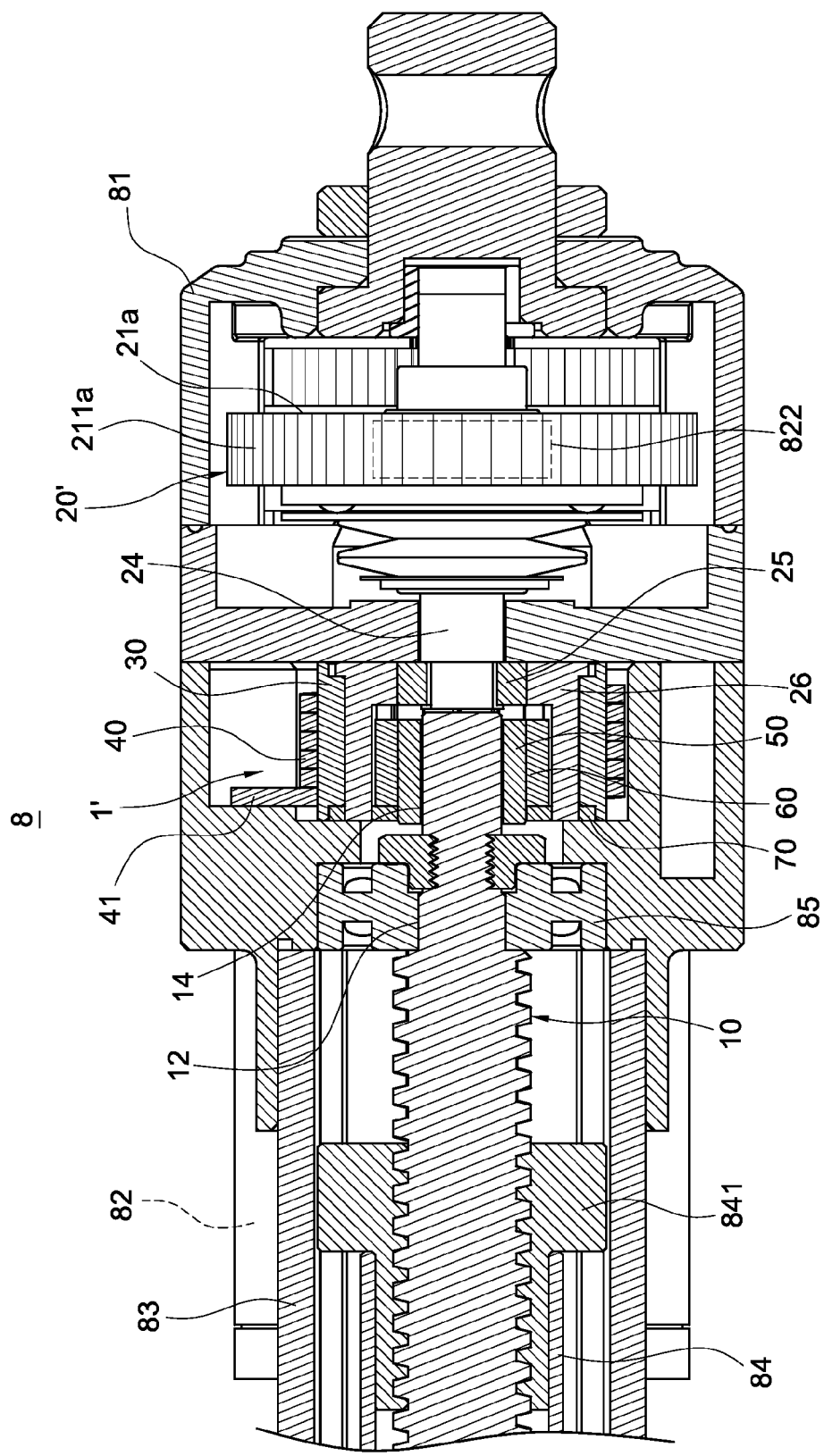
FIG. 9 is an assembled sectional view of a transmission mechanism according to another embodiment of the present invention.

As shown in FIG. 8 and FIG. 9, besides aforementioned embodiment, the transmission mechanism of the invention can also be configured as the following embodiment. According to this embodiment, the transmission mechanism 1' is mainly to arrange a plurality of keys 14 and keyways 53 between the guide screw 10 and the passive sleeve 50, both of which can be commonly rotated by means of the cooperation of the keys 50 and keyways 53. In addition, the worm wheel set 20 according to previous embodiment can be replaced by a passive assembly 20' mainly including a passive wheel 21a, a short axle 24, a coupling 25 and a claw ring 26. In this case, a plurality of straight teeth 211a formed on a peripheral edge of the passive wheel 21a are driven by the active wheel 822 of the actuator 8 to rotate. The short axle 24 passes through the center of the passive wheel 21a, and the coupling 25 is fixed onto the end side of the short axle 24 to be linked together. A plurality of wedged blocks 251 and wedged slots 261, cooperated to each other, are arranged between the coupling 25 and the claw ring 26, both of which are commonly rotated. Furthermore, a plurality of claw arms 262 are extended outwardly from one side of the claw ring 26. Between any two adjacent claw arms 262, a spacing slot 263 is formed as well. Other than that, the assembly and transmission relationships of each constituent components of this embodiment are same as those of aforementioned embodiment. A further detailed description will be not presented hereinafter.

Accordingly, through the constitution of aforementioned assemblies, a transmission mechanism having deceleration function according to the invention is thus obtained.

Summarizing aforementioned description, the transmission mechanism having deceleration function is an indispensably design for linear actuator indeed, which may positively reach the expected usage objective for solving the drawbacks of the prior arts, and which extremely possesses the innovation and progressiveness to completely fulfill the applying merits of a new type patent, according to which the invention is thereby applied. Please examine the application carefully and grant it as a formal patent for protecting the rights of the inventor.

However, the aforementioned description is only a number of preferable embodiments according to the present invention, not used to limit the patent scope of the invention, so equivalently structural variation made to the contents of the present invention, for example, description and drawings, is all covered by the claims claimed thereinafter.

What is claimed is:

1. A transmission mechanism, having a deceleration function, used in a linear actuator having a worm, including:
   a guide screw;
   a worm wheel set which is fitted onto one side of the guide screw and includes a worm wheel driven by the worm to rotate and a plurality of claw arms extended outwardly from one side of the worm wheel; a spacing slot being formed between any two adjacent claw arms;
   an intermediary ring which is fitted onto peripheral edges of the claw arms and rotatable with respect to the worm wheel set;
   an isolator which surrounds a peripheral edge of the intermediary ring with one side fixed to the actuator for limiting the intermediary ring to rotate in a single direction as clockwise or counterclockwise and stops the intermediary ring in an alternative direction;
   a passive sleeve, with a plurality of grooves arranged on a peripheral edge thereof, fitted onto the guide screw by being linked to each other, an accommodation space being formed among each groove, the spacing slot, and the intermediary ring; and
   a plurality of needle rollers, each of which is accommodated in the accommodation space and is always intercontacted with the claw arm, the intermediary ring, and the passive sleeve;
   wherein, when the worm wheel is driven to rotate, the claw arms push the needle rollers and the intermediary ring to rotate and, since the intermediary ring is wedged and stopped by the isolator, the frictional force to hinder the rotation driven by the claw arms to the needle rollers and the intermediary arms is increased, lowering down rotational speeds of the passive sleeve and the guide screw.

2. The transmission mechanism having deceleration function according to claim 1, wherein the worm wheel set is made of a plastic material.

3. The transmission mechanism having deceleration function according to claim 1, wherein the isolator is a coil spring, and a rotational direction of which is the same as that of the worm wheel.

4. The transmission mechanism having deceleration function according to claim 1, wherein the isolator is a coil spring, and a rotational direction of which is the same as that of the guide screw.

5. The transmission mechanism having deceleration function according to claim 1, wherein the plurality of grooves of the passive sleeve is configured as a "V" shape.

6. The transmission mechanism having deceleration function according to claim 1, further including a limit block cover fitted onto one side of the passive sleeve and extended outwardly by covering the needle rollers for restricting movement of the needle rollers.

7. The transmission mechanism having deceleration function according to claim 1, wherein the actuator includes a lower seat body which comprises an embedded slot into which a positioning section that extends outwardly from a coil spring is inserted.

* * * * *